United States Patent
Hatanaka et al.

(10) Patent No.: US 9,511,630 B2
(45) Date of Patent: Dec. 6, 2016

(54) PNEUMATIC RADIAL TIRE FOR PASSENGER VEHICLE AND METHOD FOR USING THE SAME

(71) Applicant: BRIDGESTONE CORPORATION, Chuo-ku, Tokyo (JP)

(72) Inventors: Shintaro Hatanaka, Kodaira (JP); Hiroyuki Matsumoto, Kodaira (JP); Isao Kuwayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 86 days.

(21) Appl. No.: 14/355,753

(22) PCT Filed: Nov. 2, 2012

(86) PCT No.: PCT/JP2012/007044
§ 371 (c)(1),
(2) Date: May 1, 2014

(87) PCT Pub. No.: WO2013/065319
PCT Pub. Date: May 10, 2013

(65) Prior Publication Data
US 2014/0290820 A1   Oct. 2, 2014

(30) Foreign Application Priority Data

Nov. 2, 2011   (JP) .................................. 2011-241564

(51) Int. Cl.
*B60C 3/04* (2006.01)
*B60C 11/03* (2006.01)
(Continued)

(52) U.S. Cl.
CPC ............... *B60C 3/04* (2013.01); *B60C 11/033* (2013.04); *B60C 11/0306* (2013.04);
(Continued)

(58) Field of Classification Search
CPC ...... B60C 11/033; B60C 11/04; B60C 11/042; B60C 11/045; B60C 11/0247; B60C 11/0306; B60C 11/0309; B60C 11/03; B60C 3/04; B60C 2011/1254; B60C 11/12; B60C 2011/1209; B60C 2011/129

See application file for complete search history.

(56) References Cited

U.S. PATENT DOCUMENTS 2,094,636 A * 10/1937 Bull .................... B60C 11/0332
152/209.28
4,266,592 A * 5/1981 Takigawa .............. B60C 11/032
152/209.17
(Continued)

FOREIGN PATENT DOCUMENTS

EP        1010551 A2    6/2000
JP        01-190504 A   7/1989
(Continued)

OTHER PUBLICATIONS

600R16 Coker Classic Blackwall Tire as accessed on the Internet Archive at http://web.archive.org/web/20081004230735/http://store.coker.com/600r16-coker-classic-blackwall-tire.html showing the page as of Oct. 4, 2008.*

(Continued)

*Primary Examiner* — Justin Fischer
*Assistant Examiner* — Philip N Schwartz
(74) *Attorney, Agent, or Firm* — Sughrue Mion, PLLC

(57) ABSTRACT

An object of the present invention is to adequately control relationship between a cross sectional width SW and an outer diameter OD of a pneumatic radial tire for a passenger vehicle. Specifically, a ground contact surface 1 of the tread of the pneumatic radial tire for a passenger car of the present invention is provided with either, as a groove, only at least one main groove 2a extending in the tread circumferential (Continued)

direction or, as grooves, only the main groove 2a and at least one auxiliary groove 2b other than the main groove, wherein the auxiliary groove has a groove width≤2 mm in a tread widthwise region and a negative ratio of the main groove 2a is in the range of 12% to 20% (inclusive of 12% and 20%).

16 Claims, 9 Drawing Sheets

(51) Int. Cl.
  *B60C 11/12* (2006.01)
  *B60C 11/04* (2006.01)
(52) U.S. Cl.
  CPC ............... *B60C 11/12* (2013.01); *B60C 11/04* (2013.01); *B60C 2011/0341* (2013.04); *B60C 2011/0344* (2013.04); *B60C 2011/0381* (2013.04); *B60C 2011/1209* (2013.04)

(56) References Cited

U.S. PATENT DOCUMENTS

| | | | | |
|---|---|---|---|---|
| 4,271,885 | A * | 6/1981 | Takigawa | B60C 11/04 152/209.18 |
| 4,387,754 | A * | 6/1983 | Mirtain | B60C 11/0306 152/209.1 |
| 5,882,450 | A | 3/1999 | Benchea | |
| 6,568,444 | B1 * | 5/2003 | Kaneko | B60C 3/04 152/209.18 |
| 2010/0186861 | A1 * | 7/2010 | Ishiguro | B60C 11/0306 152/209.25 |

FOREIGN PATENT DOCUMENTS

| | | |
|---|---|---|
| JP | 05-058109 A | 3/1993 |
| JP | 07-40706 A | 2/1995 |
| JP | 2000-190706 A | 7/2000 |
| JP | 2010-076561 A | 4/2010 |
| JP | 2011-207283 A | 10/2011 |

OTHER PUBLICATIONS

Coker Classic Radial 600R16—Blackwall Tire as accessed at http://www.tiresandwires.com/Coker-Classic-Radial-600R16—Blackwall-Tire_p_69.html on Jan. 11, 2015.*
Communication dated Jul. 14, 2015 from the Japanese Patent issued in corresponding Japanese application No. 2013541639.
Communication dated Aug. 14, 2015 from the European Patent Office issued in corresponding European application No. 12844866.9.
International Search Report for PCT/JP2012/007044 dated Feb. 5, 2013.
Communication dated Jun. 9, 2015 from the Japanese Patent Office issued in corresponding Japanese application No. 2013541639.
Communication dated Nov. 6, 2015 from the State Intellectual Property Office of the P.R.C. in counterpart application No. 201280065194.2.
Communication dated Sep. 29, 2015, from the Japanese Patent issued in corresponding Japanese application No. 2013-541639.

* cited by examiner

Ground contact configuration of wide-width tire

Ground contact configuration of narrow-width tire

FIG. 2
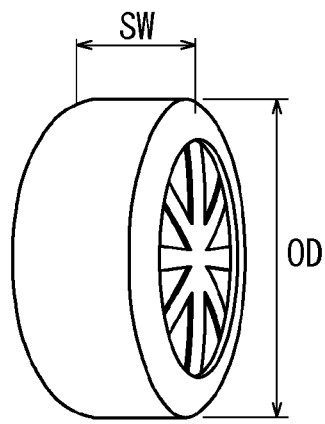
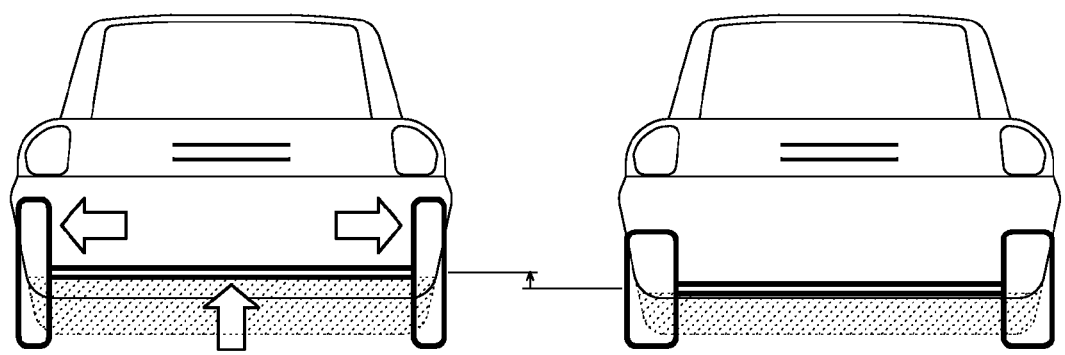
FIG. 3A            FIG. 3B

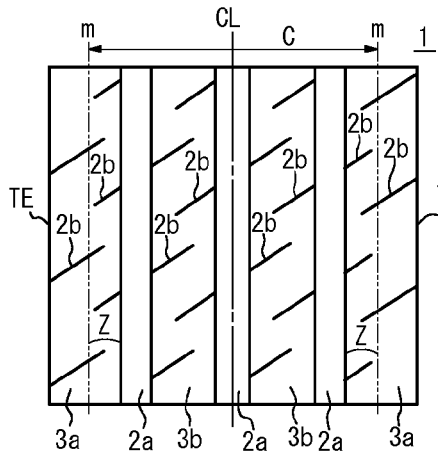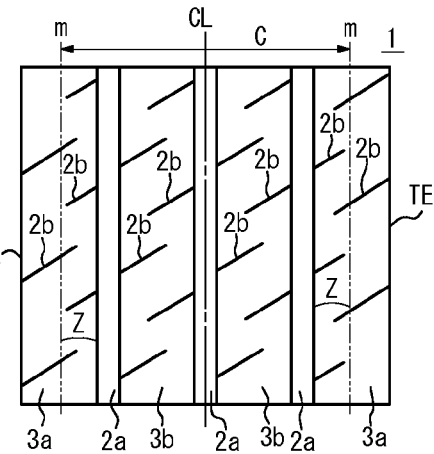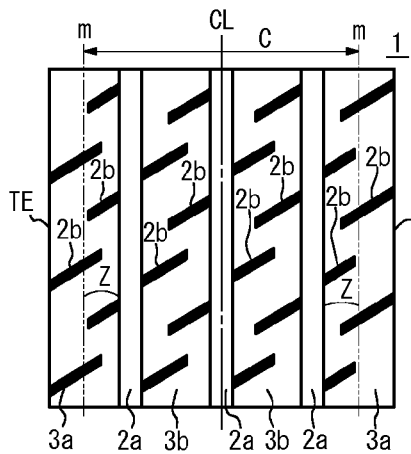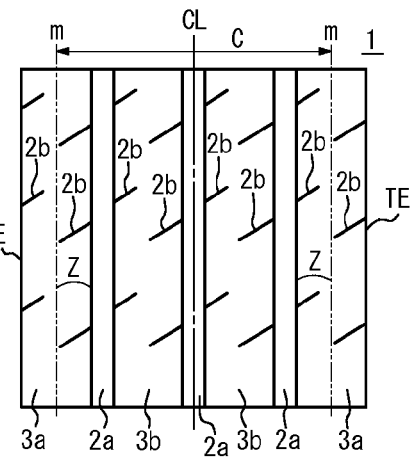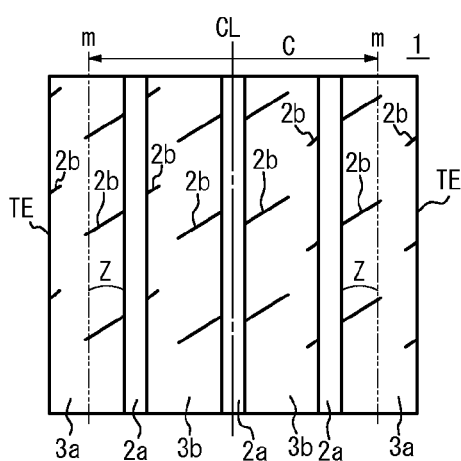

PNEUMATIC RADIAL TIRE FOR PASSENGER VEHICLE AND METHOD FOR USING THE SAME

CROSS REFERENCE TO RELATED APPLICATIONS

This application is a National Stage of International Application No. PCT/JP2012/007044 filed Nov. 2, 2012, claiming priority based on Japanese Patent Application No. 2011-241564, filed Nov. 2, 2011, the contents of all of which are incorporated herein by reference in their entirety.

TECHNICAL FIELD

The present invention relates to a pneumatic radial tire for a passenger vehicle and a method for using the pneumatic radial tire.

BACKGROUND ART

Bias tires having relatively narrow cross sectional widths were predominantly used in vehicles up to around 1960 because vehicles in those days were relatively lightweight, had relatively low cruising speed required thereof and thus did not put so much stress on the tires. However, radial tires having wide and flat structures are predominant these days because good driving stability in high speed running, as well as good wear resistance, is required of tires as highway networks are developed and vehicle speed increases (e.g. PTL 1).

However, increasing widths of tires decreases free space in a vehicle and deteriorates comfortablility therein. Further, wider widths of tires increase air resistance and cause another problem of poor fuel efficiency. There has been increasingly a demand for a better fuel efficiency in recent years as people are more concerned about environmental issues.

Electric vehicles which are being developed for use in future, in particular, must have sufficient space for accommodating driving units such as a motor for controlling torque of rotating tires around drive shafts. Ensuring sufficient space in vicinities of tires is becoming increasing important in this connection.

Further, such a wide and flat tire as described above exhibits relatively poor drainage performance because the tire has a relatively wide (ground contact) leading surface and thus water is not smoothly drained on respective sides of the tire in running in a wet condition, as schematically shown by arrows representing water flow lines in FIG. 1A. Yet further, the wide and flat tire is susceptible to what is called hydroplaning phenomenon because the tire, having a relatively short ground contact length L, allows a water film entering from the leading surface to float a ground contact surface up, so that an actual ground contact area and thus gripping force decrease, as shown in FIG. 1A. In short, the wide and flat tire has a problem of deteriorated wet performance, as well.

In view of the deteriorated wet performance, a conventional radial tire having a wide and flat structure in particular must have a main groove extending in the tread circumferential direction and/or a lug groove extending in the tread width direction each formed in a ground contact surface of a tread to have a relatively large cross-sectional area, in order to ensure good drainage performance.

However, in a case where a main groove and/or a lug groove having wide groove widths are provided in a tread, there arises a problem in that a negative ratio of the tread increases to decrease a ground contact area and gripping force, thereby deteriorating driving stability and braking performance on a dry road surface and also reducing wear resistance and worsening noise. Further, in a case where grooves having deep groove depths are provided in a tread, tread rubber must be thick accordingly, which increases tire weight and thus deteriorates running performance of the tire.

It is conventionally known that use of tread rubber having relatively low hysteresis loss for a wide and flat radial tire is effective in terms of reducing rolling resistance and thus improving fuel efficiency of the tire. However, use of rubber having relatively low hysteresis loss for a tire then causes a problem in that gripping performance of the tire on a wet road surface deteriorates.

CITATION LIST

Patent Literature

PTL 1: JP-A 07-040706

SUMMARY OF THE INVENTION

Technical Problems

A radial tire having a wide and flat structure has problems in fuel efficiency, comfortablility (free space in a vehicle) and running performance on a wet road surface (including suppression of hydroplaning phenomenon) and it is in general difficult to improve running performance on a wet road surface in particular with maintaining good running performance on a dry road surface (driving stability, braking performance on a dry road surface), as described above. A technique of fundamentally improving these performances in a compatible manner has therefore been demanded.

The present invention aims at solving the problems described above and an object thereof is to provide: a pneumatic radial tire for a passenger vehicle where good running performance on a wet road surface and good running performance on a dry road surface are attained in a compatible manner with ensuring high fuel efficiency and wide free space in a vehicle; and a method of using the pneumatic radial tire.

Solution to the Problems

The inventors of the present invention keenly studied to solve the problems described above.

As a result, the inventors first discovered that reducing a tire width and increasing a tire diameter or, more specifically, controlling a cross sectional width SW and an outer diameter OD of a radial tire under an appropriate SW-OD relationship is very effective in terms of ensuring good fuel efficiency and wide free space of a vehicle using the radial tire.

Further, the inventors newly discovered that i) providing a radial tire having small width and large diameter with a tread pattern essentially having a main groove extending in the circumferential direction of a tread and ii) setting an appropriate negative ratio of the main groove in the tread are effective in terms of improving running performance on a wet road surface with ensuring good running performance on a dry road surface of the tire.

The present invention has been contrived based on the aforementioned discoveries and main structural features are as follows.
(1) A pneumatic radial tire for a passenger vehicle of the present invention, having a carcass constituted of plies as radially-disposed cords and provided in a toroidal shape across a pair of bead portions, and a tread, characterized in that:
a ground contact surface of the tread of the tire is provided with either, as a groove, only at least one main groove extending in the tread circumferential direction or, as grooves, only the main groove and at least one auxiliary groove other than the main groove, the auxiliary groove having a groove width≤2 mm in a tread widthwise region having the center aligned with the tire equatorial plane and a width corresponding to 80% of the tread width of the ground contact surface;
a negative ratio of the main groove is in the range of 12% to 20% (inclusive of 12% and 20%);
provided that SW and OD represent cross sectional width and outer diameter of the tire, respectively, SW/OD≤0.26 when SW<165 (mm); and
SW and OD satisfy a formula shown below when SW≥165 (mm).

$$OD \geq 2.135 \times SW + 282.3$$

A pneumatic radial tire for a passenger vehicle of the present invention, having a carcass constituted of plies as radially-disposed cords and provided in a toroidal shape across a pair of bead portions, and a tread, characterized in that:
a ground contact surface of the tread of the tire is provided with either, as a groove, only at least one main groove extending in the tread circumferential direction or, as grooves, only the main groove and at least one auxiliary groove other than the main groove, the auxiliary groove having a groove width≤2 mm in a tread widthwise region having the center aligned with the tire equatorial plane and a width corresponding to 80% of a tread width of the ground contact surface;
a negative ratio of the main groove is in the range of 12% to 20% (inclusive of 12% and 20%);
provided that SW and OD represent cross sectional width and outer diameter of the tire, respectively, SW and OD satisfy a formula shown below.

$$OD \geq -0.0187 \times SW^2 + 9.15 \times SW - 380$$

In the present invention, a "ground contact surface" of a tread represents a region over the entire periphery in the tire circumferential direction of a tread rubber surface of a tire in contact with a flat plate when the tire is placed upright with respect to the flat plate in a standard state where the tire is assembled with a rim and inflated at the maximum air pressure under the maximum load prescribed for each vehicle on which the tire is to be mounted. A "tread width" represents the maximum width in the tire width direction of a ground contact surface of a tire in the aforementioned standard state. "The maximum load prescribed for each passenger vehicle" represents the largest load value among respective four load values exerted on four tires of the passenger vehicle when the prescribed upper limit number of occupants ride in the passenger vehicle. An "auxiliary groove having a groove width≤2 mm" may include a hole-like recess having diameter≤2 mm as shown in FIG. 7A.
Further, a "main groove extending in the tread circumferential direction" represents a groove continuously extending in the tread circumferential direction over the entire periphery of a tire and may include e.g. a zigzag extending groove, as well as a groove linearly extending in complete parallel with the tread circumferential direction.
Yet further, a "negative ratio of the main groove" represents a ratio of the total area of all the main grooves provided in a ground contact surface of a tread with respect to the area of the ground contact surface of the tread. An area of each main groove is calculated as an area of an opening portion of the main groove.

Advantageous Effect of the Invention

According to the present invention, it is possible to provide a pneumatic radial tire for a passenger vehicle where good running performance on a wet road surface and good running performance on a dry road surface are attained in a compatible manner with ensuring high fuel efficiency and wide free space in a vehicle.

BRIEF DESCRIPTION OF THE DRAWINGS

FIG. 2 is a view showing a cross sectional width SW and an outer diameter OD of a tire.
FIG. 3A is a view showing a vehicle having the tires of the present invention with large diameters and narrow widths mounted thereon.
FIG. 3B is a view showing a vehicle having the conventional tires mounted thereon.
FIGS. 10A to 10C are developed views each showing a tread pattern of a tire according to a Comparative Example.
FIG. 10D and FIG. 10E are developed views each showing a tread pattern of a tire according to the present invention.

DESCRIPTION OF THE EMBODIMENTS

Figure 1A:
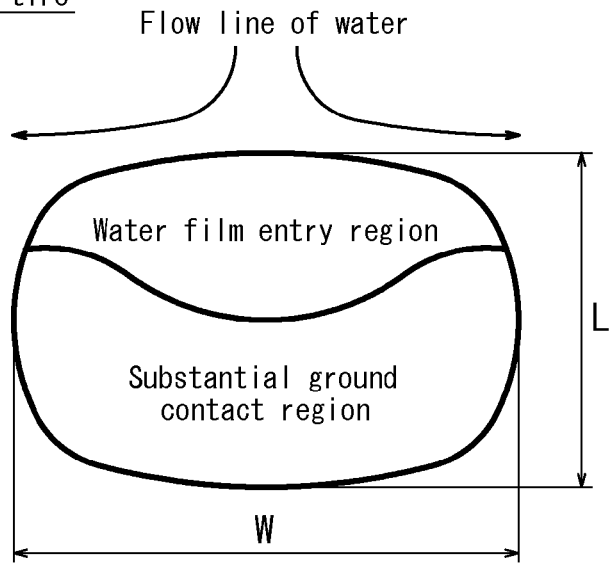
FIG. 1A is a view for explaining wet performance of a radial tire having a wide width.

How a pneumatic radial tire for a passenger vehicle of the present invention (which tire will be referred to simply as a "tire" hereinafter) has been realized will be described below. First, the inventors of the present invention paid attention to a fact that a tire cross sectional width SW (see FIG. 2) of a radial tire smaller than that of the conventional radial tire ensures a wide free space in a vehicle, a wide space for accommodating a driving member in vicinities on the vehicle-inner side of the tire in particular (see FIG. 3A).

A tire cross sectional width SW of a radial tire smaller than that of the conventional radial tire also causes a good effect of reducing an air resistance value (Cd value) of a vehicle because an area of the tire viewed from the front thereof decreases.

However, there is a demerit in this case in that a rolling resistance value (RR value) of the tire increases due to an increase in magnitude of deformation of a ground contact portion of a tread when the internal air pressure of the tire remains the same.

The inventors of the present invention, in view of the aforementioned situation, discovered that the problem can be solved by utilizing the characteristics inherent to a radial tire. Specifically, the inventors of the present invention realized that, in the case of a radial tire having a smaller magnitude of tread deformation than a bias tire, it is possible to make the radial tire be less affected by a rough road surface and thus reduce a rolling resistance value (RR value) thereof when the internal air pressure remains the same by increasing the outer diameter OD (see FIG. 2) of the radial tire as compared with the conventional radial tire. Further, the inventors of the present invention also realized that an increase in outer diameter OD of a radial tire enhances the loading capacity of the tire. Yet further, an increase in outer diameter of a radial tire increases height of drive shafts to enlarge an under-chassis space, thereby allowing the vehicle to keep wide spaces for a car boot, driving units and the like.

In short, reducing width and increasing outer diameter of a tire effectively ensure a wide space in a vehicle, respectively, although they are in a trade-off relationship in terms of a rolling resistance value (RR value). Reducing tire width also successfully decreases an air resistance value (Cd value) of a vehicle.

In view of this, the inventors of the present invention keenly studied optimizing a relationship between a tire cross sectional width and an outer diameter of a tire such that an air resistance value (Cd value) and a rolling resistance value (RR value) of a vehicle improve than the conventional radial tire.

Specifically, the inventors of the present invention, paying their attention to a relationship between a tire cross sectional width SW and an outer diameter OD of a tire, carried out a test including mounting test tires of various tire sizes (some of them were non-standard products) on a vehicle and measuring an air resistance value (Cd value) and a rolling resistance value (RR value) for each type or size of the test tires. A condition satisfied by SW and OD when both of an air resistance value and a rolling resistance value were superior to those of the conventional radial tire was empirically deduced based on the measurement results.

The experiment results from which the optimum relationship between SW and OD was obtained will be described in detail hereinafter.

First, there was prepared as Reference tire 1 a tire having tire size: 195/65R15, which tire size is used in vehicles of the most common types and thus suitable for comparison of tire performances. There was also prepared as Reference tire 2 a tire having tire size: 225/45R17, which is what is called an "inch-up" version of Reference tire 1.

Further, there were prepared other test tires (test tires 1 to 52 and conventional test tires 1 to 9) of various tire sizes, as well.

Each of these test tires was assembled with a rim and subjected to following tests.

Figure 4A:
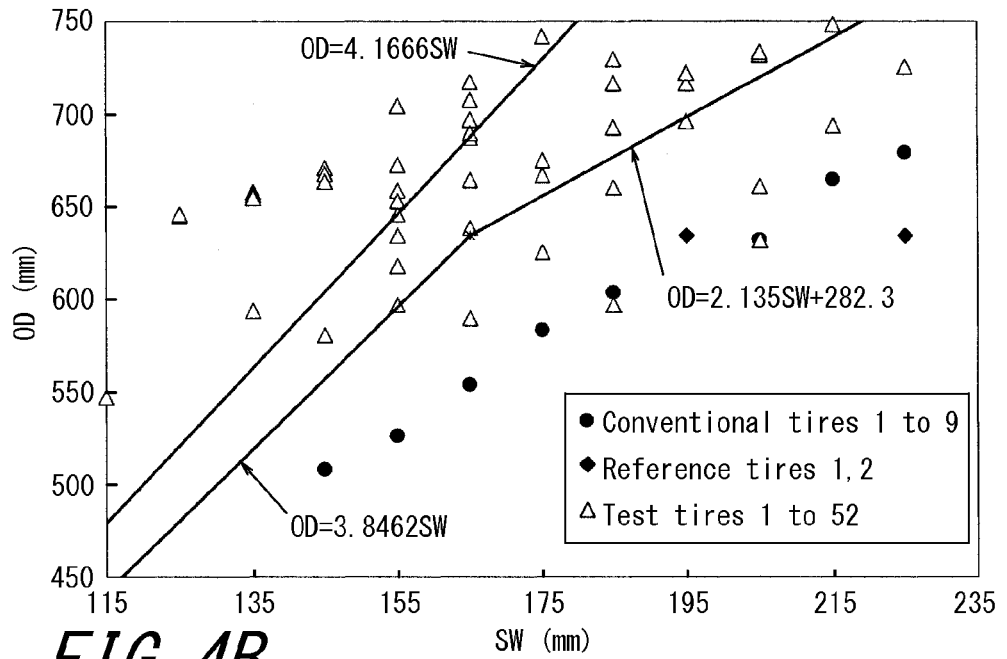
FIG. 4A is a graph showing relationships between SW and OD observed in the test tires of the present invention and the conventional test tires.
Figure 4B:
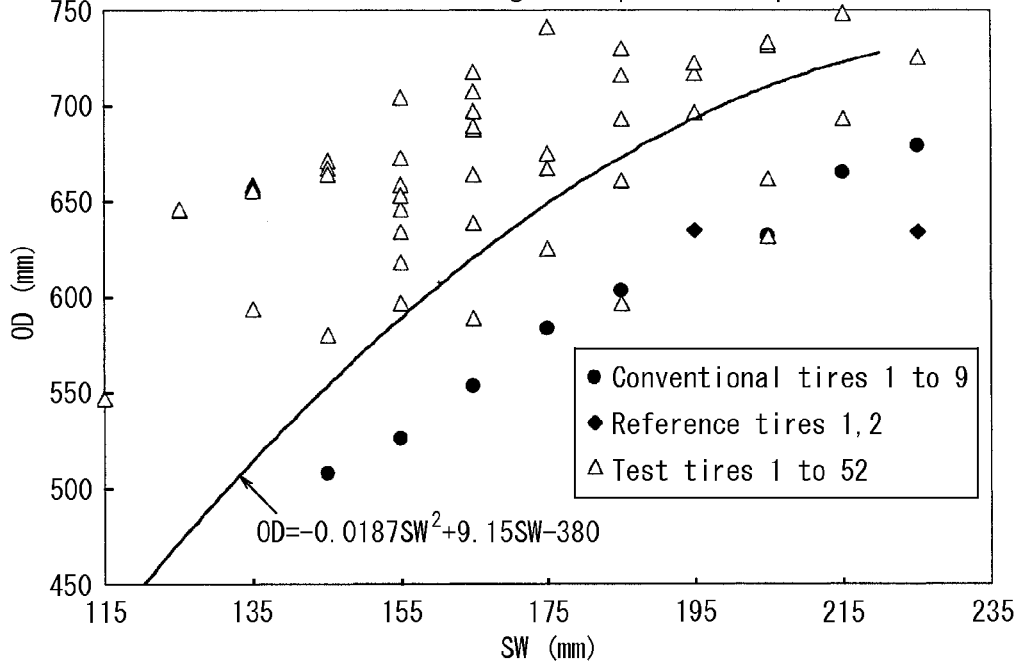
FIG. 4B is a graph showing a relationship between SW and OD observed in the test tires of the present invention and the conventional test tires.

Table 1, FIG. 4A and FIG. 4B show relevant specific characteristics of the respective test tires. Other characteristics of each test tire than those shown in Table 1 (e.g. internal structures thereof) were the same as those of a tire commonly in use. Each of the test tires included a carcass constituted of plies as radially-disposed cords and provided in a toroidal shape across a pair of bead portions, and a tread. With regard to tire sizes, a variety of tire sizes including the conventional sizes prescribed in JATMA (The Japan Automobile Tyre Manufacturers Association, Inc.) in Japan, TRA (THE TIRE and RIM ASSOCIATION INC.) in the United States, ETRTO (European Tyre and Rim Technical Organisation) in Europe and the like and those beyond these conventional sizes were widely studied.

TABLE 1-1

|  | Tire size | SW (mm) | OD (mm) | SW/OD |
|---|---|---|---|---|
| Conventional tire 1 | 145/70R12 | 145 | 507.8 | 0.29 |
| Conventional tire 2 | 155/55R14 | 155 | 526.1 | 0.29 |
| Conventional tire 3 | 165/60R14 | 165 | 553.6 | 0.30 |
| Conventional tire 4 | 175/65R14 | 175 | 583.1 | 0.30 |
| Conventional tire 5 | 185/60R15 | 185 | 603 | 0.31 |
| Conventional tire 6 | 205/55R16 | 205 | 631.9 | 0.32 |
| Conventional tire 7 | 215/60R16 | 215 | 664.4 | 0.32 |
| Conventional tire 8 | 225/55R17 | 225 | 679.3 | 0.33 |
| Conventional tire 9 | 245/45R18 | 245 | 677.7 | 0.36 |
| Reference tire 1 | 195/65R15 | 195 | 634.5 | 0.31 |
| Reference tire 2 | 225/45R17 | 225 | 634.3 | 0.35 |
| Test tire 1 | 155/55R21 | 155 | 704.5 | 0.22 |
| Test tire 2 | 165/55R21 | 165 | 717.4 | 0.23 |
| Test tire 3 | 155/55R19 | 155 | 653.1 | 0.24 |
| Test tire 4 | 155/70R17 | 155 | 645.8 | 0.24 |
| Test tire 5 | 165/55R20 | 165 | 689.5 | 0.24 |
| Test tire 6 | 165/65R19 | 165 | 697.1 | 0.24 |
| Test tire 7 | 165/70R18 | 165 | 687.5 | 0.24 |
| Test tire 8 | 165/55R16 | 165 | 589.3 | 0.28 |
| Test tire 9 | 175/65R15 | 175 | 625.0 | 0.28 |
| Test tire 10 | 185/60R17 | 185 | 660.7 | 0.28 |
| Test tire 11 | 195/65R17 | 195 | 696.4 | 0.28 |
| Test tire 12 | 205/60R18 | 205 | 732.1 | 0.28 |
| Test tire 13 | 185/50R16 | 185 | 596.8 | 0.31 |
| Test tire 14 | 205/60R16 | 205 | 661.3 | 0.31 |
| Test tire 15 | 215/60R17 | 215 | 693.5 | 0.31 |
| Test tire 16 | 225/65R17 | 225 | 725.8 | 0.31 |
| Test tire 17 | 155/45R21 | 155 | 672.9 | 0.23 |
| Test tire 18 | 205/55R16 | 205 | 631.9 | 0.32 |
| Test tire 19 | 165/65R19 | 165 | 697.1 | 0.24 |
| Test tire 20 | 155/65R18 | 155 | 658.7 | 0.24 |
| Test tire 21 | 145/65R19 | 145 | 671.1 | 0.22 |
| Test tire 22 | 135/65R19 | 135 | 658.1 | 0.21 |
| Test tire 23 | 125/65R19 | 125 | 645.1 | 0.19 |
| Test tire 24 | 175/55R22 | 175 | 751.3 | 0.23 |
| Test tire 25 | 165/55R20 | 165 | 689.5 | 0.24 |
| Test tire 26 | 155/55R19 | 155 | 653.1 | 0.24 |
| Test tire 27 | 145/55R20 | 145 | 667.5 | 0.22 |
| Test tire 28 | 135/55R20 | 135 | 656.5 | 0.21 |
| Test tire 29 | 125/55R20 | 125 | 645.5 | 0.19 |
| Test tire 30 | 175/45R23 | 175 | 741.7 | 0.24 |
| Test tire 31 | 165/45R22 | 165 | 707.3 | 0.23 |
| Test tire 32 | 155/45R21 | 155 | 672.9 | 0.23 |
| Test tire 33 | 145/45R21 | 145 | 663.9 | 0.22 |
| Test tire 34 | 135/45R21 | 135 | 654.9 | 0.21 |
| Test tire 35 | 145/60R16 | 145 | 580.4 | 0.25 |
| Test tire 36 | 155/60R17 | 155 | 617.8 | 0.25 |
| Test tire 37 | 165/55R19 | 165 | 664.1 | 0.25 |
| Test tire 38 | 155/45R18 | 155 | 596.7 | 0.26 |
| Test tire 39 | 165/55R18 | 165 | 638.7 | 0.26 |
| Test tire 40 | 175/55R19 | 175 | 675.1 | 0.26 |
| Test tire 41 | 115/50R17 | 115 | 546.8 | 0.21 |
| Test tire 42 | 105/50R16 | 105 | 511.4 | 0.21 |
| Test tire 43 | 135/60R17 | 135 | 593.8 | 0.23 |
| Test tire 44 | 185/60R20 | 185 | 730 | 0.25 |
| Test tire 45 | 185/50R20 | 185 | 693.0 | 0.27 |
| Test tire 46 | 195/60R19 | 195 | 716.6 | 0.27 |
| Test tire 47 | 175/60R18 | 175 | 667.2 | 0.26 |
| Test tire 48 | 195/55R20 | 195 | 722.5 | 0.27 |
| Test tire 49 | 215/50R21 | 215 | 748.4 | 0.29 |
| Test tire 50 | 205/55R20 | 205 | 733.5 | 0.28 |
| Test tire 51 | 185/45R22 | 185 | 716.3 | 0.26 |
| Test tire 52 | 155/65R13 | 155 | 634.3 | 0.29 |

<Rolling Resistance (RR Value)>
Rolling resistance was measured by: assembling each of the test tires described above with a rim to obtain a tire-rim assembly inflated at internal pressure as shown in Tables 2-1 and 2-2; exerting on the tire-rim assembly the maximum load prescribed for a vehicle on which the tire is mounted; and running the tire at drum rotation speed of 100 km/hour to measure a rolling resistance thereof.

The evaluation results are shown as index values relative to "100" of Reference tire 1. The smaller index value represents the smaller rolling resistance.

<Air Resistance (Cd) Value of Vehicle>
Air resistance was determined by: assembling each of the test tires described above with a rim to obtain a tire-rim assembly inflated at internal pressure as shown in Tables 2-1 and 2-2; mounting the tire-rim assembly on a vehicle of 1500 cc displacement; and blasting air on the tire at speed corresponding to 100 km/hour and measuring an air pressure value experienced by the tire by a balance installed on the floor under the tire. The results were converted to index values relative to "100" of Reference tire 1 for evaluation. The smaller index value represents the smaller air resistance. The evaluation results are shown in Tables 2-1, 2-2 and FIGS. 4A, 4B.

TABLE 2-1

|  | Tire size | Internal pressure (kPa) | RR value (INDEX) | Cd value (INDEX) |
|---|---|---|---|---|
| Conventional tire 1 | 145/70R12 | 295 | 108 | 94 |
| Conventional tire 2 | 155/55R14 | 275 | 111.3 | 91 |
| Conventional tire 3 | 165/60R14 | 260 | 108.6 | 93 |
| Conventional tire 4 | 175/65R14 | 245 | 103.6 | 101 |
| Conventional tire 5 | 185/60R15 | 230 | 103.9 | 98 |
| Conventional tire 6 | 205/55R16 | 220 | 101 | 102 |
| Conventional tire 7 | 215/60R16 | 220 | 93 | 104 |
| Conventional tire 8 | 225/55R17 | 220 | 85 | 106 |
| Conventional tire 9 | 245/45R18 | 220 | 80 | 111 |
| Reference tire 1 | 195/65R15 | 220 | 100 | 100 |
| Reference tire 2 | 225/45R17 | 220 | 83 | 106 |
| Test tire 1 | 155/55R21 | 220 | 60 | 90 |
| Test tire 2 | 165/55R21 | 220 | 55 | 94 |
| Test tire 3 | 155/55R19 | 220 | 90 | 90 |
| Test tire 4 | 155/70R17 | 220 | 85 | 95 |
| Test tire 5 | 165/55R20 | 220 | 72 | 97 |
| Test tire 6 | 165/65R19 | 220 | 65 | 97 |
| Test tire 7 | 165/70R18 | 220 | 61 | 98 |
| Test tire 8 | 165/55R16 | 220 | 102 | 92 |
| Test tire 9 | 175/65R15 | 220 | 98 | 97 |
| Test tire 10 | 185/60R17 | 220 | 85 | 99 |
| Test tire 11 | 195/65R17 | 220 | 78 | 100 |
| Test tire 12 | 205/60R18 | 220 | 69 | 102 |
| Test tire 13 | 185/50R16 | 220 | 108 | 97 |
| Test tire 14 | 205/60R16 | 220 | 98 | 102 |
| Test tire 15 | 215/60R17 | 220 | 91 | 103 |
| Test tire 16 | 225/65R17 | 220 | 85 | 105 |
| Test tire 17 | 155/45R21 | 220 | 70 | 90 |
| Test tire 18 | 205/55R16 | 220 | 99 | 102 |
| Test tire 19 | 165/65R19 | 260 | 92.2 | 98 |
| Test tire 20 | 155/65R18 | 275 | 96 | 91 |

TABLE 2-2

|  | Tire size | Internal pressure (kPa) | RR value (INDEX) | Cd value (INDEX) |
|---|---|---|---|---|
| Test tire 21 | 145/65R19 | 295 | 92.4 | 89 |
| Test tire 22 | 135/65R19 | 315 | 91.6 | 87 |
| Test tire 23 | 125/65R19 | 340 | 88.2 | 85 |
| Test tire 24 | 175/55R22 | 345 | 84.8 | 96 |
| Test tire 25 | 165/55R20 | 260 | 92.6 | 93 |
| Test tire 26 | 155/55R19 | 275 | 96.2 | 91 |
| Test tire 27 | 145/55R20 | 290 | 92.3 | 89 |
| Test tire 28 | 135/55R20 | 310 | 92.4 | 87 |
| Test tire 29 | 125/55R20 | 340 | 87.7 | 85 |
| Test tire 30 | 175/45R23 | 250 | 85.5 | 96 |
| Test tire 31 | 165/45R22 | 255 | 89.7 | 93 |
| Test tire 32 | 155/45R21 | 270 | 93.2 | 91 |
| Test tire 33 | 145/45R21 | 290 | 92.2 | 89 |
| Test tire 34 | 135/45R21 | 310 | 92.1 | 87 |
| Test tire 35 | 145/60R16 | 290 | 93.9 | 89 |
| Test tire 36 | 155/60R17 | 270 | 92.1 | 91 |
| Test tire 37 | 165/55R19 | 255 | 89.4 | 93 |
| Test tire 38 | 155/45R18 | 270 | 92.1 | 91 |
| Test tire 39 | 165/55R18 | 255 | 89.4 | 93 |
| Test tire 40 | 175/55R19 | 250 | 88.7 | 96 |
| Test tire 41 | 115/50R17 | 350 | 86.7 | 83 |
| Test tire 42 | 105/50R16 | 350 | 94.1 | 80 |
| Test tire 43 | 135/60R17 | 300 | 85.6 | 87 |
| Test tire 44 | 185/60R20 | 270 | 73.0 | 98 |
| Test tire 45 | 185/50R20 | 270 | 80.0 | 98 |
| Test tire 46 | 195/60R19 | 258 | 81.3 | 100 |
| Test tire 47 | 175/60R18 | 286 | 84.7 | 96 |
| Test tire 48 | 195/55R20 | 277 | 83.3 | 100 |
| Test tire 49 | 215/50R21 | 250 | 75.0 | 104 |
| Test tire 50 | 205/55R20 | 263 | 78.7 | 102 |
| Test tire 51 | 185/45R22 | 285 | 86.7 | 98 |
| Test tire 52 | 155/65R13 | 220 | 90 | 91 |

Figure 5:
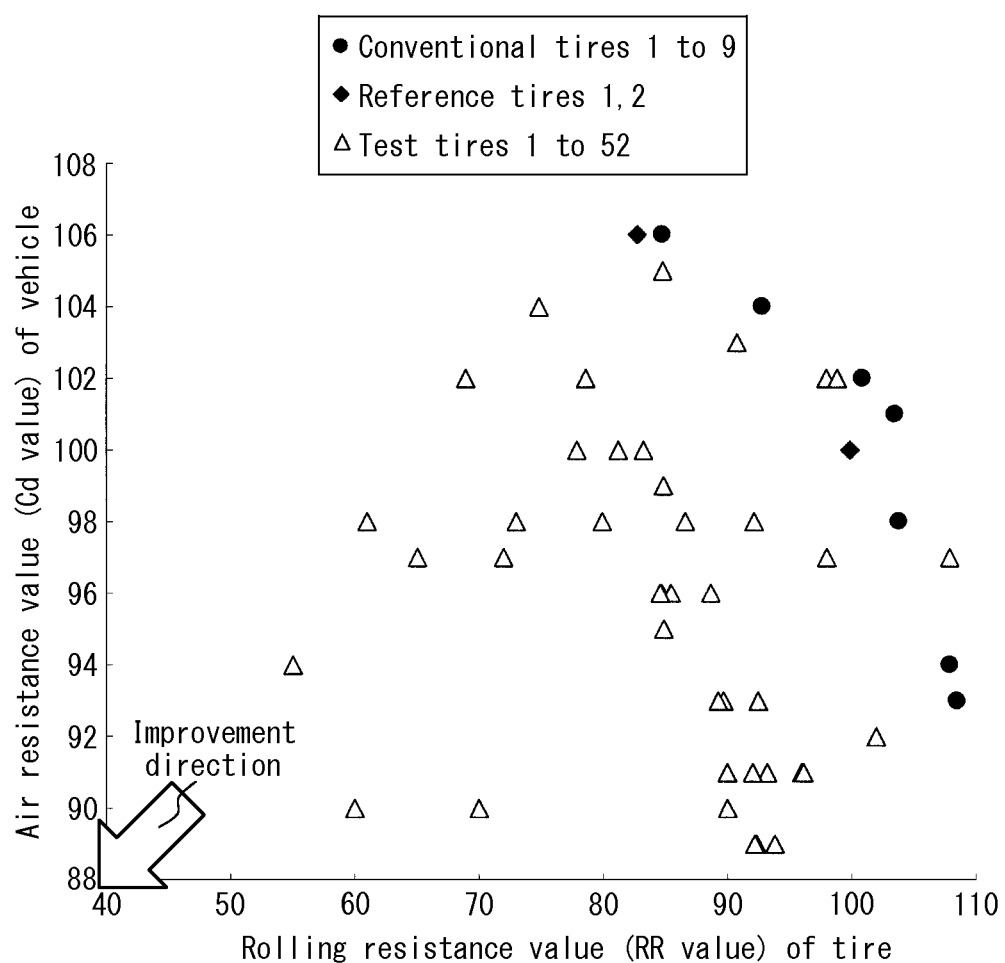
FIG. 5 is a graph showing a relationship between rolling resistance value and air resistance value in each of the test tires.

It has been revealed from the test results shown in Tables 2-1 and 2-2, FIG. 4A and FIG. 5 that a radial tire exhibits satisfactorily low air resistance value (Cd value) and rolling resistance value (RR value) in a compatible manner in a state where the tire is mounted on a vehicle, as compared with Reference tire 1 having tire size: 195/65R15 as the conventional tire, when the tire has a tire size satisfying the following formulae (which formulae will be referred to as "relationship formulae (1)" hereinafter), provided that SW and OD represent cross sectional width and outer diameter of the tire, respectively.

$SW/OD \leq 0.26$ when $SW < 165$ (mm); and $OD \geq 2.135 \times SW + 282.3$ when $SW \geq 165$ (mm)

FIG. 4A shows borderlines (borderlines according to linear equations) differentiating the test tires each exhibiting a good effect of reducing both rolling resistance value (RR value) and air resistance value (Cd value) thereof in a compatible manner from the test tires not causing the effect in a satisfactory manner. Specifically, one of the borderlines is constituted of a line expressing $OD=(1/0.26) \times SW$ when $SW<165$ (mm) and a line expressing $OD=2.135 \times SW+282.3$ when $SW \geq 165$ (mm).

It has been revealed from the test results shown in Tables 2-1 and 2-2, FIG. 4B and FIG. 5 that a radial tire exhibits satisfactorily low air resistance value (Cd value) and rolling resistance value (RR value) in a compatible manner in a state where the tire is mounted on a vehicle, as compared with Reference tire 1 having tire size: 195/65R15 as the conventional tire, when the tire, inflated at internal pressure≥250 kPa, has a tire size satisfying the following formula (which formula will be referred to as "relationship formula (2)" hereinafter), provided that SW and OD represent cross sectional width and outer diameter of the tire, respectively.

$OD \geq -0.0187 \times SW^2 + 9.15 \times SW - 380$

FIG. 4B shows a borderline (a borderline according to a quadratic equation) differentiating the test tires each exhibiting a good effect of reducing both rolling resistance value (RR value) and air resistance value (Cd value) thereof in a compatible manner from the test tires not causing the effect in a satisfactory manner. Specifically, the borderline is constituted of a quadratic curve expressing $OD=-0.0187\times SW^2+9.15\times SW-380$.

Further, the inventors of the present invention discovered that test tires 1 to 7 and 17, each satisfying SW/OD≤0.24, more reliably obtain the aforementioned good effect than other test tires, as shown in Tables 2-1, 2-2 and FIGS. 4A and 5.

Next, the following tests were carried out for each of test tires 1 to 18 in order to evaluate fuel efficiency and comfortability (degree of free space) of a vehicle on which the tire was mounted.

<In-Use Fuel Economy>
A test was carried out based on the JOC 8 test cycle prescribed by Ministry of Land, Infrastructure, Transport and Tourism (MLIT) of Japan. The evaluation results are shown as index values relative to "100" of Reference tire 1. The larger index value represents the better fuel efficiency.

<Comfortability>
Each of the test tires was mounted on a vehicle having 1.7 m width and the resulting width of the rear trunk was measured. The evaluation results are shown as index values relative to "100" of Reference tire 1. The larger index value represents the better comfortability.

The test results thus obtained are shown in Table 3 below.

TABLE 3

| | Relationship formula (1) | Relationship formula (2) | In-use fuel economy | Comfortability |
|---|---|---|---|---|
| Test tire 1 | Satisfied | Satisfied | 117 | 105 |
| Test tire 2 | Satisfied | Satisfied | 119 | 104 |
| Test tire 3 | Satisfied | Satisfied | 105 | 105 |
| Test tire 4 | Satisfied | Satisfied | 107 | 105 |
| Test tire 5 | Satisfied | Satisfied | 112 | 104 |
| Test tire 6 | Satisfied | Satisfied | 114 | 104 |
| Test tire 7 | Satisfied | Satisfied | 116 | 104 |
| Test tire 8 | Not satisfied | Not satisfied | 100 | 104 |
| Test tire 9 | Not satisfied | Not satisfied | 101 | 102 |
| Test tire 10 | Not satisfied | Not satisfied | 106 | 101 |
| Test tire 11 | Not satisfied | Satisfied | 109 | 100 |
| Test tire 12 | Satisfied | Satisfied | 112 | 99 |
| Test tire 13 | Not satisfied | Not satisfied | 97 | 101 |
| Test tire 14 | Not satisfied | Not satisfied | 101 | 99 |
| Test tire 15 | Not satisfied | Not satisfied | 103 | 98 |
| Test tire 16 | Not satisfied | Not satisfied | 106 | 97 |
| Test tire 17 | Satisfied | Satisfied | 116 | 105 |
| Test tire 18 | Not satisfied | Not satisfied | 99 | 99 |
| Reference tire 1 | — | — | 100 | 100 |

It is understood from Table 3 that some of the test tires satisfying neither relationship formulae (1) nor relationship formula (2) (see FIGS. 4A and 4B) exhibited poorer results than Reference tire 1 in at least one of fuel efficiency and comfortability. In contrast, test tires 1 to 7, 12 and 17 (see FIGS. 4A and 4B) satisfying at least one of relationship formulae (1) and relationship formula (2) unanimously exhibited better results than Reference tire 1 in both fuel efficiency and comfortability.

The inventors of the present invention revealed from the findings described above that it is possible to reduce both air resistance value and rolling resistance value of a pneumatic radial tire in a state where the tire is mounted on a vehicle and also enhance fuel efficiency and comfortability of the vehicle by setting cross sectional width SW and outer diameter OD of the tire to satisfy the aforementioned relationship formulae (1) and/or relationship formula (2).

Next, a tread pattern required for the pneumatic radial tire for a passenger vehicle of which SW and OD satisfy relationship formulae (1) and/or relationship formula (2), to achieve good running performance on a wet road surface and good running performance on a dry road surface in a compatible manner, will be described.

FIGS. 6A to 6F are developed views each showing a tread pattern of a pneumatic radial tire for a passenger vehicle satisfying relationship formulae (1) and/or relationship formula (2) according to one embodiment of the present invention.

Figure 6A:
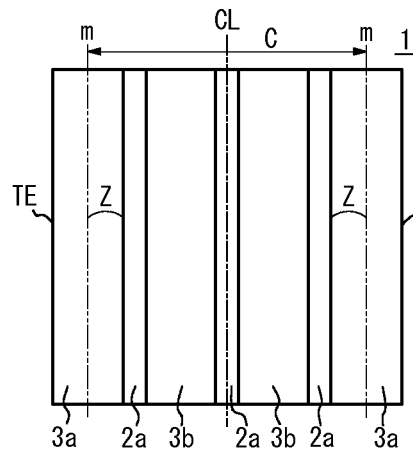
FIGS. 6A to 6F are developed views each showing a tread pattern of a tire according to one embodiment of the present invention.
Figure 6B:
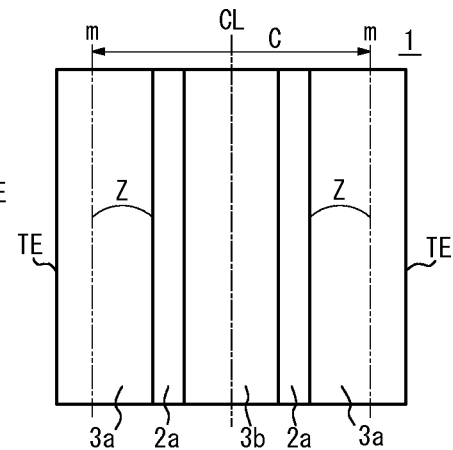

FIG. 6A and FIG. 6B show developed views of treads of tires according to first and second embodiments of the present invention, respectively.

These tires of the present invention each have at least one groove including at least one main groove 2a extending in the tread circumferential direction formed in a ground contact surface 1 of the tread, as shown in FIG. 6A and FIG. 6B, respectively. A ground contact surface 1 of the tread of the tire is provided with, as grooves, only three main grooves 2a extending in the tread circumferential direction in the example shown in FIG. 6A. A ground contact surface 1 of the tread of the tire is provided with, as grooves, only two main grooves 2a extending in the tread circumferential direction in the example shown in FIG. 6B.

It is critically important that a negative ratio of the main groove in each of the tires of the first and second embodiments of the present invention is in the range of 12% to 20% (inclusive of 12% and 20%).

An effect caused by the tires of the first and second embodiments of the present invention will be described hereinafter.

Figure 1B:
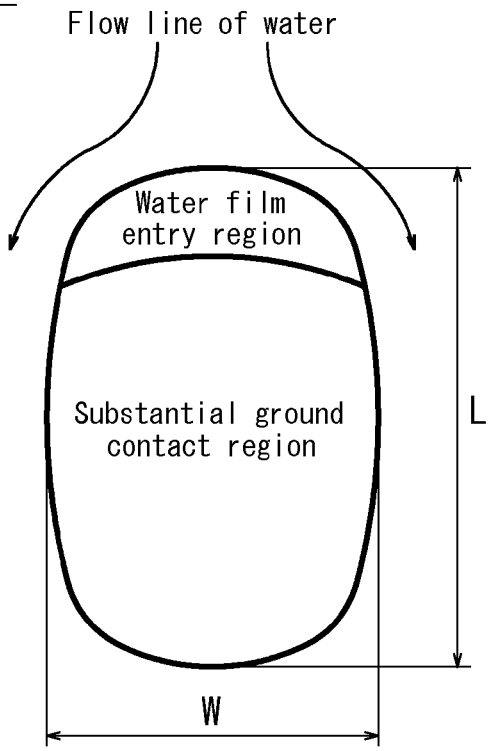
FIG. 1B is a view for explaining wet performance of a radial tire having a narrow width.

According to each of the tires of the first and second embodiments of the present invention, water is easily drained toward respective sides in the tire width direction and entry of water within a ground contact surface is suppressed on a wet road surface, as schematically indicated by the arrows in FIG. 1B, because the tire, satisfying relationship formulae (1) and/or relationship formula (2), has a relatively narrow tire width, i.e. a relatively narrow width of a (ground contact) leading surface.

Further, with regard to drainage of water which has been entered within a ground contact surface of the tire, each of the tires of the first and second embodiments can effectively drain the water by provision of the main grooves 2a therein to extend in the tread circumferential direction as shown in FIGS. 6A and 6B, because the tire, satisfying relationship formulae (1) and/or relationship formula (2) and thus having a relatively large diameter, has a relatively long ground contact length L in the tire circumferential direction as shown in FIG. 1B. Accordingly, even a groove pattern provided with only the main grooves 2a extending in the tread circumferential direction (i.e. a groove pattern lacking grooves opening to tread ends TE) as shown in FIGS. 6A and 6B can reliably exhibit satisfactorily good drainage properties.

Further, according to each of the tires of the first and second embodiments, it is possible to ensure satisfactory drainage and improve running performance of the tire on a wet road surface even at a significantly low negative ratio≤20% of the main groove.

With regard to running on a dry road surface, each of the tires of the first and second embodiments can ensure a satisfactory large area of land portions due to the low negative ratio of the main grooves thereof (≤20%). Further, a ground contact surface of the tread is provided with, as grooves, only the main grooves extending in the tread circumferential direction, whereby the land portions of the tire extend continuously in the circumferential direction and have relatively high rigidities to well suppress collapse of the land portions. As a result, the tire can reliably have a satisfactorily large ground contact area, good driving stability, good braking performance on a dry road surface, and good wear resistance.

In the present invention, satisfactory drainage performance cannot be ensured when a negative ratio of the main groove is less than 12% because then the total area of the main grooves is too small. On the other hand, satisfactory running performance on a dry road surface cannot be ensured when a negative ratio exceeds 20% because then the total area of the land portions is too small.

As described above, according to each of the tires of the first and second embodiments of the present invention, it is possible to achieve good running performance on a wet road surface and good running performance on a dry road surface in a compatible manner with ensuring high fuel efficiency and wide free space in a vehicle.

The tires of the first and second embodiments of the present invention each have no grooves other than the main grooves in a ground contact surface of the tread thereof. Accordingly, these tires have higher rigidities of the land portions and thus better running performance on a dry road surface in particular than tires of third to sixth embodiments described below.

FIGS. 6C to 6F are developed views of treads of tires according to third to sixth embodiments of the present invention, each showing a case where the tread has grooves (auxiliary grooves) other than the main grooves extending in the tread circumferential direction.

Figure 6C:
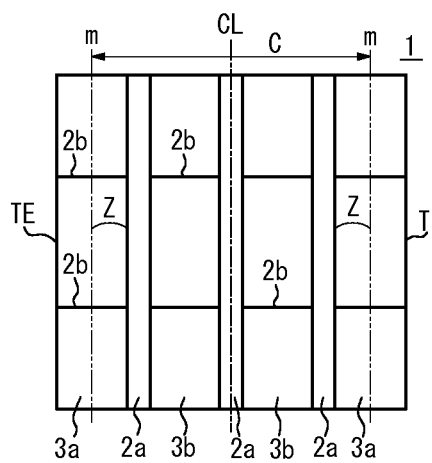

The tire of the third embodiment has at least one groove including at least one main groove 2a extending in the tread circumferential direction formed in a ground contact surface 1 of the tread, as shown in FIG. 6C.

Specifically, the tire of the third embodiment has three main grooves 2a extending in the tread circumferential direction and auxiliary grooves 2b (two auxiliary grooves in the area shown in FIG. 6C) extending in the tread width direction formed in the ground contact surface 1 of the tread, as shown in FIG. 6C.

In the present embodiment, each of the auxiliary grooves 2b as the grooves other than the main grooves 2a extending in the tread circumferential direction has a groove width≤2 mm in a tread widthwise region C (a region between two borderlines m in FIG. 6C) having the center aligned with the tire equatorial plane and a width corresponding to 80% of the tread width of the ground contact surface.

It is critically important that a negative ratio of the main groove in the tire of the third embodiment is in the range of 12% to 20% (inclusive of 12% and 20%) as in the foregoing embodiments.

An effect caused by the tire of the third embodiment of the present invention will be described hereinafter.

According to the tire of the third embodiment, first of all, entry of water into a ground contact surface can be suppressed on a wet road surface because the leading surface width is narrow as in the tires of the first and second embodiments.

Further, water can be effectively drained by provision of the main grooves 2a extending in the tread circumferential direction therein, as shown in FIG. 6C, because the tire of the present embodiment has a relatively large diameter as in the first embodiment. Yet further, good drainage for good wet performance is more reliably ensured in the tire of the present embodiment by provision of the auxiliary grooves 2b opening to tread ends TE therein.

Yet further, according to the tire of the third embodiment, it is possible to ensure satisfactory drainage and improve running performance of the tire on a wet road surface at a significantly low negative ratio≤20% of the main groove.

With regard to running on a dry road surface, the tire of the third embodiment can ensure a satisfactory large area of land portions due to the low negative ratio of the main grooves thereof (≤20%). Further, the land portions of the tire have relatively high rigidity to well suppress collapse of the land portions because a ground contact surface of the tread is provided with only the auxiliary grooves 2b each having a groove width≤2 mm other than the main grooves 2a extending in the tread circumferential direction. As a result, the tire can reliably have a satisfactorily large ground contact area, good driving stability, good braking performance on a dry road surface, and good wear resistance. Satisfactory drainage performance cannot be ensured when a negative ratio of the main groove is less than 12% because then the total area of the main grooves is too small in the present embodiment as in the first and second embodiments. On the other hand, satisfactory running performance on a dry road surface cannot be ensured when a negative ratio exceeds 20% because then the total area of the land portions is too small. Further, rigidities of the land portions decrease and good running performance on a dry road surface cannot be ensured when the groove width of the auxiliary groove 2b exceeds 2 mm.

Accordingly, the groove width of the auxiliary groove is preferably ≤1 mm in order to ensure satisfactorily high rigidities of the land portions.

As described above, according to the tire of the third embodiment of the present invention, it is possible to achieve good running performance on a wet road surface and good running performance on a dry road surface in a compatible manner with ensuring high fuel efficiency and wide free space in a vehicle.

The tire of the third of the present invention exhibits better drainage and better wet performance in particular than the tires of the first and second embodiments because the former has the auxiliary grooves 2b, as well, other than the main grooves 2a extending in the tread circumferential direction in the ground contact surface 1 of the tread thereof.

Figure 6D:
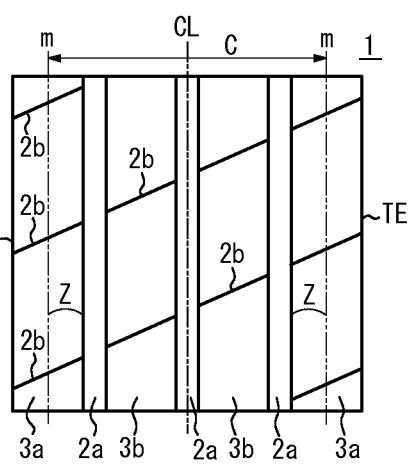

FIG. 6D is a developed view of a tread of a tire according to a fourth embodiment of the present invention.

The tire of the fourth embodiment shown in FIG. 6D is different from the tire of the third embodiment shown in FIG. 6C only in that the auxiliary grooves 2b other than the main grooves 2a extending in the tread circumferential direction of the former extend to be inclined with respect to the tread width direction.

According to the tire of the fourth embodiment, drainage properties thereof improve than the tire of the third embodiment because the auxiliary grooves 2b of the former extend to be inclined with respect to the tread width direction such that the former can ensure longer water passages than the latter.

An inclination angle of each of the auxiliary grooves 2b with respect to the tread width direction is preferably in the range of 20° to 60° in the present embodiment. The inclination angle≥20° can ensure a satisfactorily long groove length to enhance a drainage effect of the auxiliary groove because the larger inclination angle results in the longer groove length. The inclination angle≤60° prevents corner portions of the land portions demarcated by the auxiliary grooves 2b from being too sharp, i.e. block rigidities from decreasing too low, thereby successfully ensuring good running performance on a dry road surface.

Figure 6E:
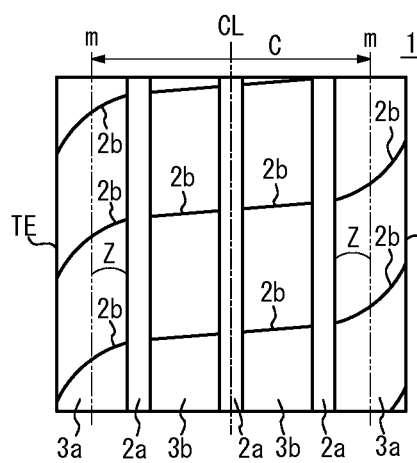

FIG. 6E is a developed view of a tread of a tire according to a fifth embodiment of the present invention.

In the tire of the fifth embodiment shown in FIG. 6E, the auxiliary grooves 2b other than the main grooves 2a extending in the tread circumferential direction each extend from the tire equatorial plane CL toward the outer side in the tread width direction in each half portion in the tread width direction of the tread such that the inclination angle of each auxiliary groove 2b with respect to the tread width direction gradually increases from the tire equatorial plane CL toward the outer side in the tread width direction. In the example shown in FIG. 6E, each of the auxiliary grooves 2b is provided to be point-symmetrical around the intersection thereof with the tire equatorial plane CL.

According to the tire of the fifth embodiment shown in FIG. 6E, rigidities of the land portions increase because close contact of groove walls facing each other of each of the auxiliary grooves 2b is facilitated due to the curved configurations of the auxiliary grooves 2b. That is, rigidities of the land portions can be increased, while ensuring good drainage performance equivalent to the tire of the fourth embodiment, in the tire of the fifth embodiment so that running performance thereof on a dry road surface in particular improves. Further, a satisfactorily large ground contact area is ensured due to the increase in rigidities of the land portions, while maintaining good drainage performance by the main grooves 2a, in the tire of the fifth embodiment so that running performance thereof on a wet road surface also improves.

Figure 6F:
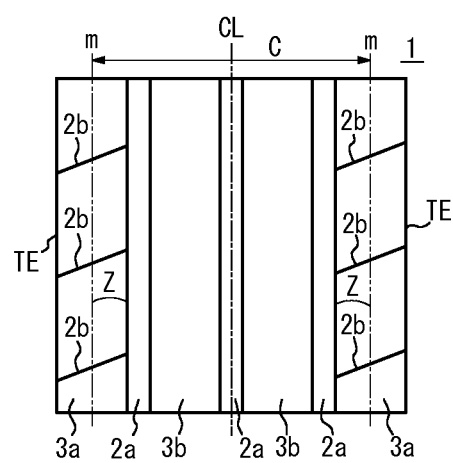

FIG. 6F is a developed view of a tread of a tire according to a sixth embodiment of the present invention.

The tire of the sixth embodiment shown in FIG. 6F is different from the tire of the fourth embodiment shown in FIG. 6D only in that the auxiliary grooves 2b extending to be inclined with respect to the tread width direction, other than the main grooves 2a extending in the tread circumferential direction, are provided only each outermost land portion 3a in the tread width direction defined by a corresponding tread end TE and the corresponding main groove 2a extending in the tread circumferential direction and adjacent to the tread end TE.

According to the tire of the sixth embodiment, it is possible to improve running performance on a wet road surface by good drainage in the respective outermost land portions in the tread width direction having the auxiliary grooves 2b therein, while suppressing deterioration of running performance on a dry road surface to the minimum by high rigidities of the land portions on the inner side in the tread width direction.

In the present invention, in a case where a ground contact surface of the tread has the auxiliary grooves as described above therein, the total length L of the auxiliary grooves per unit area of the ground contact surface of the tread is preferably 0 (mm/mm$^2$)<L≤0.05 (mm/mm$^2$).

Drainage properties can be improved by provision of the auxiliary grooves. In this connection, it is possible to reliably obtain high rigidities of the land portions to ensure good running performance on a dry road by setting the aforementioned total length L not to exceed 0.05 (mm/mm$^2$).

In the present invention, "the total length of the auxiliary grooves per unit area of a ground contact surface of the tread" represents a quotient obtained by dividing the sum of the extension lengths (an extension length is a length along the extending direction) of all of the auxiliary grooves provided in the ground contact surface of the tread by the area of the ground contact surface of the tread.

The number of the main grooves is preferably three or less in terms of ensuring high rigidities of the land portions.

The groove width of the main groove is preferably in the range of 4 mm to 30 mm and the groove depth of the main groove is preferably in the range of 5 mm to 8 mm in terms of achieving good wet performance and good dry performance in a compatible manner.

It is preferable in the third to sixth embodiments that the groove depth of the auxiliary groove 2b is at least 4 mm and does not to exceed the depth of the main groove 2a. In this connection, the term "groove depth" represents the maximum depth in a case where a groove has a varying groove depth distribution in the extending direction thereof. The groove depth of the auxiliary groove 2b is preferably at least 4 mm because then the auxiliary groove can function effectively as a water passage and good drainage properties thereof can be ensured even after the tread is worn.

A pitch (interval) between the auxiliary grooves 2b in the tread circumferential direction is preferably in the range of 20 mm to 60 mm.

The pitch≥20 mm successfully ensures high rigidities of the land portions and the pitch≤60 mm successfully ensures good drainage properties of the tire.

In the present invention, the ground contact surface 1 of the tread preferably has: the respective outermost land portions 3a in the tread width direction each defined by the corresponding tread end TE and the corresponding main groove 2a closest to the tread end TE; and at least one tread-width-direction inner land portion 3b defined on the inner side in the tread width direction of the outermost land portions 3a between the main grooves 2a, such that the width in the tread width direction of each outermost land portion 3a is at least ⅕ of the width of the ground contact surface of the tread.

The width in the tread width direction of each outermost land portion 3a is preferably at least ⅕ of the width of the ground contact surface of the tread because then rigidities of the outermost land portions 3a are ensured and wiping deformation and crushing deformation occurring in the outermost land portions 3a in the ground contact surface are suppressed, so that driving stability improves.

On the other hand, the width in the tread width direction of each outermost land portion 3a is equal to or less than ⅓ of the width of the ground contact surface of the tread in terms of suppressing deterioration of cornering power caused by buckling.

In the present invention, "the width in the tread width direction of each outermost land portion" 3a represents, in a case where the width varies depending on positions in the tread circumferential direction, e.g. in a case where the main groove defining the land portion extends zigzag, the average of the width in the tread width direction of the outermost land portion over the entire periphery of the tread.

Further, "the width of a ground contact surface of the tread" represents a distance (the maximum distance) in the tread width direction between respective ends of a ground contact surface of the tread in contact with a flat plate when the tire is placed upright with respect to the flat plate in a state where the tire is assembled with a rim and inflated at the maximum air pressure under the maximum load prescribed for each vehicle on which the tire is to be mounted.

The width in the tread width direction of the tread-width-direction inner land portion 3b is preferably at least 23 mm. In a case where a ground contact surface of the tread has a plurality of the inner land portion 3b therein, it is preferable that each of the inner land portions 3b has a width≥23 mm in the tread width direction.

The width in the tread width direction of each inner land portion 3b is preferably at least 23 mm because then high rigidities of the inner land portions 3b are ensured to improve driving stability.

The width in the tread width direction of the tread-width-direction inner land portion 3b may be set to be 50 mm or less.

In the present invention, "the width in the tread width direction of the tread-width-direction inner land portion" represents, in a case where the width varies depending on positions in the tread circumferential direction, e.g. in a case where at least one of the main grooves defining the land portion extends zigzag, the average of the width in the tread width direction of the inner land portion over the entire periphery of the tread.

Figure 7A:
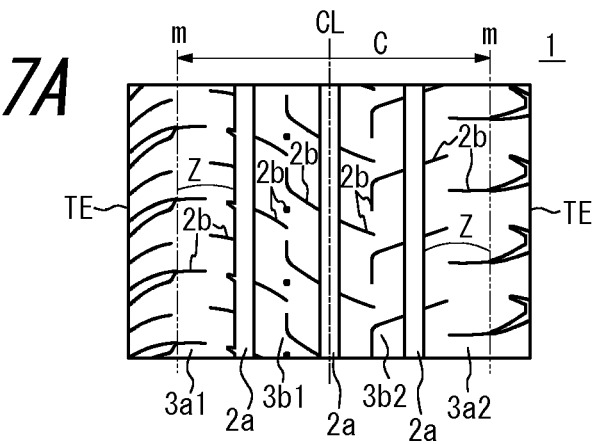
FIGS. 7A to 7C are developed views each showing a tread pattern of a tire according to another embodiment of the present invention.
Figure 7B:
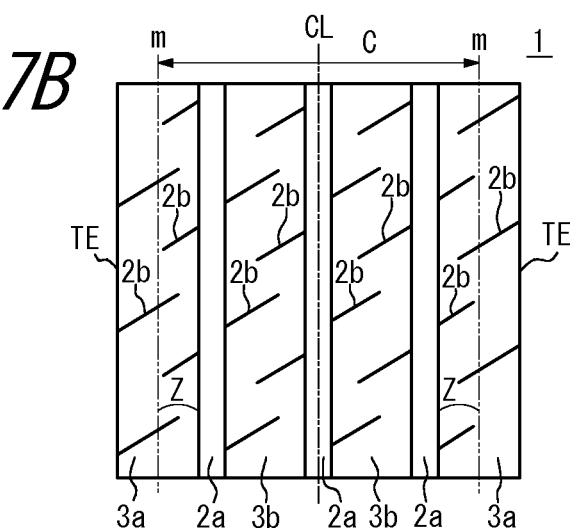
Figure 7C:
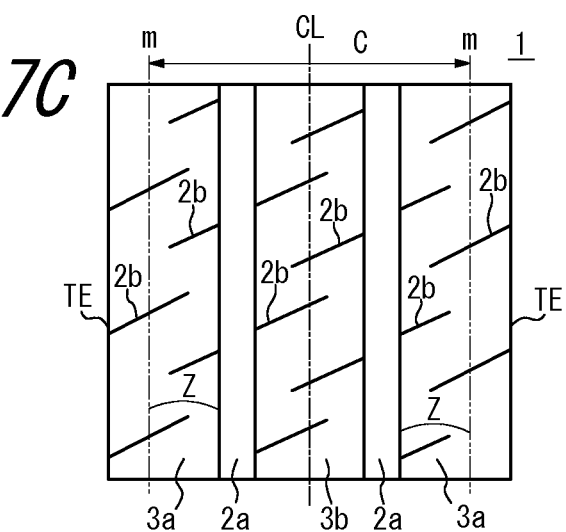

FIGS. 7A to 7C are developed views showing tread patterns of tires according to other embodiments of the present invention.

The tires shown in FIGS. 7A to 7C each have: a plurality (two or three in the examples shown in the drawings) of the main grooves 2a extending in the tread circumferential direction; respective land portions 3a each defined by the corresponding main groove 2a and the corresponding tread end TE; at least one land portion 3b defined between the main grooves 2a; and a plurality of the auxiliary grooves 2b provided in the land portions 3a, 3b. In the present embodiment, each of the auxiliary grooves 2b has a groove width≤2 mm in a tread widthwise region C (a region between two borderlines m in FIGS. 7A to 7C) having the center aligned with the tire equatorial plane and a width corresponding to 80% of the tread width of the ground contact surface 1. It should be noted that the groove width of the auxiliary groove 2b exceeds 2 mm on the outer regions in the tread width direction than the tread widthwise region C in FIG. 7A.

The respective land portions 3a, 3b each have a cyclic pattern in which the auxiliary grooves 2b of each type are provided in the tread circumferential direction at a constant pitch (interval).

In the example shown in FIG. 7A, the tread-width-direction outermost land portion 3a1 in one half portion of the tread in the width direction thereof is provided with: i) auxiliary grooves 2b each extending toward the inner side in the tread width direction from the corresponding tread end TE and having a groove width≤2 mm; ii) auxiliary grooves 2b each extending toward the inner side in the tread width direction from the corresponding tread end TE and having a groove width>2 mm in a region on the outer side in the tread width direction than the region C and a groove width≤2 mm in the region C; and iii) auxiliary grooves 2b each opening to the corresponding main groove 2a and extending from the main groove 2a toward the outer side in the tread width direction, such that the auxiliary grooves 2b of type i) and the auxiliary grooves 2b of type ii) are disposed alternately in the tread circumferential direction.

Further, in the example shown in FIG. 7A, each of the tread-width-direction inner land portions 3b1, 3b2 is provided with iv) a plurality of auxiliary grooves 2b each opening to the corresponding main groove 2a and extending within the inner land portion 3b1/3b2. The inner land portion 3b1, in particular, is provided with v) auxiliary grooves 2b which are hole-like recesses having diameter≤2 mm.

Yet further, in the example shown in FIG. 7A, the tread-width-direction outermost land portion 3a2 in the other half portion of the tread in the width direction thereof is provided with: vi) auxiliary grooves 2b each branched into two sub-grooves at the corresponding tread end TE and extending toward the inner side in the tread width direction. One of the sub-grooves has a groove width>2 mm and terminates within the land portion on the outer side in the tread width direction than the region C. The other of the sub-grooves extends to the inside of the region C and having a groove width>2 mm in a region on the outer side in the tread width direction than the region C and a groove width≤2 mm inside the region C.

The examples shown in FIG. 7B and FIG. 7C have three/two main grooves 2a therein, respectively. In each of these examples shown in FIG. 7B and FIG. 7C, each land portion 3a is provided with: vii) auxiliary grooves 2b each extending from the corresponding tread end TE toward the inner side in the tread width direction to terminate within the land portion 3a; and viii) auxiliary grooves 2b each extending from the corresponding main groove 2a toward the outer side in the tread width direction to terminate within the land portion 3a, such that the auxiliary grooves 2b of type vii) and the auxiliary grooves 2b of type iii) are disposed alternately in the tread circumferential direction. Further, each land portion 3b is provided with: ix) auxiliary grooves 2b each extending from one of the main grooves 2a defining the land portion 3a toward the inner side in the tread width direction to terminate within the land portion 3b; and x) auxiliary grooves 2b each extending from the other main groove 2a defining the land portion 3 toward the outer side in the tread width direction to terminate within the land portion 3b, such that the auxiliary grooves 2b of type ix) and the auxiliary grooves 2b of type x) are disposed alternately in the tread circumferential direction.

In short, one end of each auxiliary groove 2b opens to the corresponding tread end TE/main groove 2a and the other end thereof terminates within the land portion in the tread patterns shown in FIGS. 7A to 7C.

In the tread patterns shown in FIGS. 7A to 7C, provided that a land portion Z is (hypothetically) demarcated by the main groove 2a closest to each tread end TE and the corresponding borderline m of the tread widthwise region C having the center aligned with the tire equatorial plane CL and a width corresponding to 80% of the tread width of the ground contact surface 1, the following relationship formulae are satisfied in at least one of the tread-width-direction inner land portion 3b (3b1, 3b2) and the land portion Z (in each of the land portions 3b, Z in the examples shown in FIGS. 7A to 7C).

$$1/4 \leq W1/W2 \leq 3/4 \text{ and}$$

$$\Sigma W1 \geq W2$$

wherein: W1 represents a projected length in the tread width direction of each auxiliary groove 2b (a length in the tread width direction of each auxiliary groove 2b when the auxiliary groove 2b is projected in the tread circumferential direction); W2 represents a width in the tread width direction of the land portion having said auxiliary groove 2b, of at least one of the land portions (Z, 3b); ΣW1 represents the sum of projected lengths in the tread width direction of all auxiliary grooves 2b disposed within one pitch (e.g. two auxiliary grooves of type iv) and one auxiliary groove of type v) in the land portion 3b1) in the tread circumferential direction of the auxiliary grooves, i.e. the sum of lengths in the tread width direction of these auxiliary grooves 2b when the auxiliary grooves 2b are projected in the tread circumferential direction.

As described above, in the tire of the present invention, provided that a land portion Z is defined by the main groove 2a closest to each tread end TE and the corresponding borderline m (the borderline m closer to said main groove 2a, of the two borderlines m, m), the following relationship formulae are preferably satisfied in at least one of the tread-width-direction inner land portion 3b (3b1, 3b2) and the land portion Z, as shown in FIGS. 7A to 7C.

$$\tfrac{1}{4} \leq W1/W2 \leq \tfrac{3}{4} \text{ and}$$

$$\Sigma W1 \geq W2$$

The aforementioned requirement is based on a discovery that ensuring rigidity is relatively important in a tire having narrow width and large diameter because such a tire experiences relatively high ground-contact pressure, while achieving good drainage properties relatively easily. It is possible to ensure satisfactory drainage performance by setting the ratio W1/W2 to be $\geq \tfrac{1}{4}$ and $\Sigma W1$ to be $\geq W2$ and enhance rigidities of the land portions to further improve running performance on a dry road surface in particular by setting the ratio W1/W2 to be $\leq \tfrac{3}{4}$.

Further, the tire of the present invention is preferably used at internal pressure of 250 kPa or higher.
Belt tension increases and, as a result, ground-contact pressure increases and resistance to hydroplaning improves when tire is used at high internal pressure.
The internal pressure in use, however, is preferably 400 kPa or less and more preferably 350 kPa or less. In general, a pneumatic radial tire for a passenger car can bear load and suppress deterioration of riding comfort due to an increase in the longitudinal spring constant in a satisfactory manner at internal pressure within the aforementioned range. An air volume of the tire of the present invention is preferably $\geq 15{,}000$ cm$^3$ because a tire for a passenger vehicle must have an air volume $\geq 15{,}000$ cm$^3$ in order to reliably have the minimum loading capacity required of a passenger car running on public roads.

EXAMPLES

Test tires of Examples 1 to 21 and test tires of Comparative Examples 1 to 7 were prepared in order to confirm an effect of the present invention. The detailed characteristics of the respective test tires are shown in Table 4.
In Table 4, "Negative ratio" represents a negative ratio of the main groove(s); "Total length" represents the total length of the auxiliary grooves per unit area of a ground contact surface of the tread; "Width of land portion 3a" represents a width in the tread width direction of the outermost land portion in the tread width direction; and "Width of land portion 3b" represents a width in the tread width direction of the tread-width-direction inner land portion. In the column of "W1/W2", two W1/W2 ratios are shown in combination e.g. (0.1, 0.8), in a case where one type of auxiliary groove extends from one end portion of a land portion and another type of auxiliary groove extends from the other end portion of the land portion such that the one type of auxiliary grooves and another type of auxiliary grooves are disposed alternately in the tread circumferential direction.
Further, the main groove 2a has a groove depth: 7 mm and linearly extends, i.e. is inclined at an inclination angle of substantially 0° with respect to the tread circumferential direction, in each of Examples 1 to 21 and Comp. Examples 1 to 7. Yet further, the auxiliary grooves 2b each have a groove depth: 5 mm and a pitch (interval) therebetween in the tread circumferential direction: 30 mm in the test tires having the auxiliary grooves 2b.
The following tests were carried out for evaluating performances of these test tires.

<Wet Braking Performance>
A braking distance (m) was measured by: mounting the test tires of each type on a vehicle; running the vehicle on a wet road surface at speed of 60 km/hour and then pushing the brake pedal to the floor, and measuring the distance traveled from pushing the brake pedal until the vehicle stopped.
The braking distances thus measured are expressed as index values relative to "100" of Comp. Example 4 for evaluation. The larger index value represents the better wet braking performance.

<Driving Stability>
Driving stability was determined by: mounting the test tire of each type on a vehicle; running the vehicle on a test course constituted of a circuit including a long, straight road, a handling-evaluation course including lots of gentle curves, and the like at speed in the range of relatively low to about 150 km/hour, and making a driver evaluate driving stability (steering response) based on how he/she felt (10 points for the full score). The larger index value represents the better driving stability.

<Dry Braking Performance>
A braking distance (m) was measured by: mounting the test tires of each type on a vehicle; running the vehicle on a dry road surface at speed of 40 km/hour and then pushing the brake pedal to the floor, and measuring the distance traveled from pushing the brake pedal until the vehicle stopped.
The braking distances thus measured are expressed as index values relative to "100" of Comp. Example 4 for evaluation. The larger index value represents the better dry braking performance.

<Wear Resistance>
Wear resistance was determined by subjecting the test tire of each type to a drum testing machine test, measuring remaining groove depths after running 100,000 km, and calculating an amount of wear based thereon.
The wear resistance values thus measured are expressed as index values relative to "100" of Comp. Example 4 for evaluation. The larger index value represents the better wear resistance.

<In-Use Fuel Economy>
A fuel efficiency test was carried out as described above and the resulting values thus measured are expressed as index values relative to "100" of Comp. Example 4 for evaluation. The larger index value represents the better fuel efficiency.
The respective evaluation results are shown in Table 5.

TABLE 4

Figure 9A:
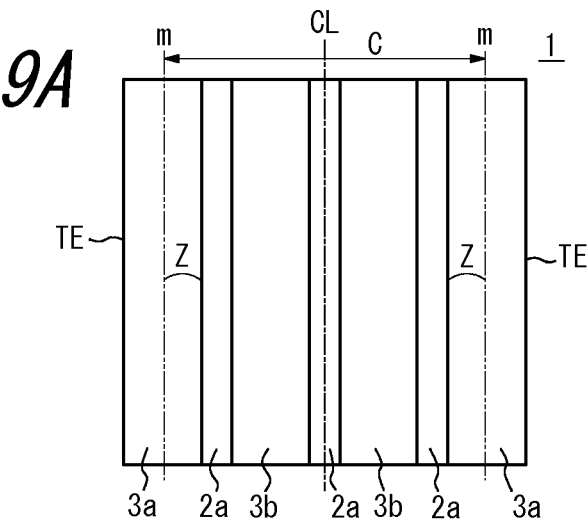
FIGS. 9A to 9C are developed views each showing a tread pattern of a tire according to a Comparative Example.

|  | Drawing | SW/OD | Relationship formula (1) | Relationship formula (2) | Negative ratio (%) | Main groove 2a Number | Main groove 2a Groove width (mm) | Auxiliary groove 2b Groove width (mm) |
|---|---|---|---|---|---|---|---|---|
| Example 1 | FIG. 6A | 0.24 | Satisfied | Satisfied | 18 | 3 | 7.1 | 0 |
| Example 2 | FIG. 6B | 0.24 | Satisfied | Satisfied | 18 | 2 | 10.6 | 0 |
| Comp. Ex. 1 | FIG. 6A | 0.32 | Not satisfied | Not satisfied | 18 | 3 | 9.6 | 0 |
| Comp. Ex. 2 | FIG. 9A | 0.24 | Satisfied | Satisfied | 10 | 3 | 3.9 | 0 |

TABLE 4-continued

Figure 8A:
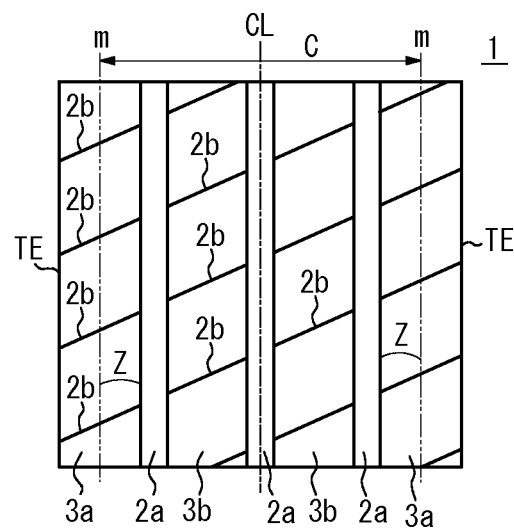
FIG. 8A and FIG. 8B are developed views each showing a tread pattern of a tire according to one embodiment of the present invention.
Figure 8B:
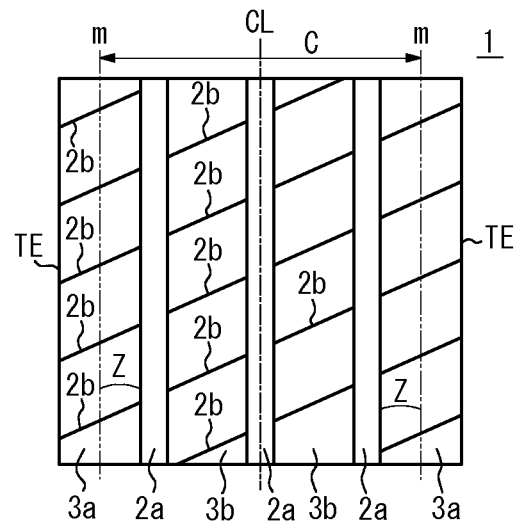
Figure 9B:
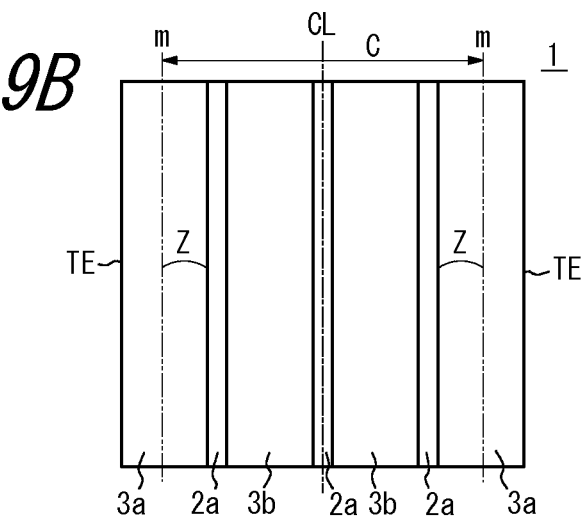
Figure 9C:
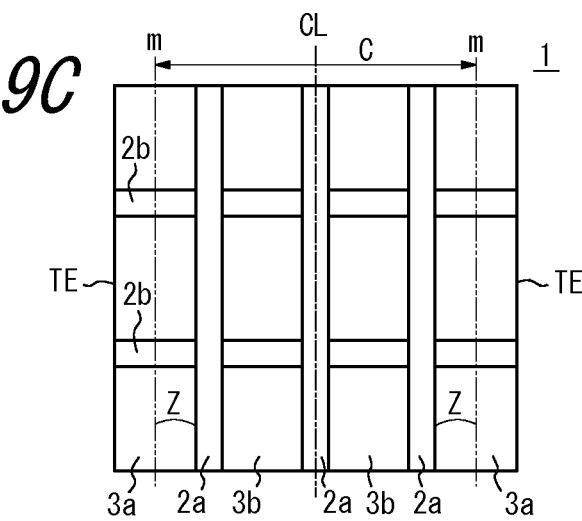

|  |  |  |  |  |  |  |  |  |
|---|---|---|---|---|---|---|---|---|
| Comp. Ex. 3 | FIG. 9B | 0.24 | Satisfied | Satisfied | 25 | 3 | 9.8 | 0 |
| Comp. Ex. 4 | FIG. 9C | 0.24 | Satisfied | Satisfied | 18 | 3 | 7.1 | 3 |
| Example 3 | FIG. 6C | 0.24 | Satisfied | Satisfied | 18 | 3 | 7.1 | 1 |
| Example 4 | FIG. 6D | 0.24 | Satisfied | Satisfied | 18 | 3 | 7.1 | 1 |
| Example 5 | FIG. 6E | 0.24 | Satisfied | Satisfied | 18 | 3 | 7.1 | 1 |
| Example 6 | FIG. 6F | 0.24 | Satisfied | Satisfied | 18 | 3 | 7.1 | 1 |
| Example 7 | FIG. 8A | 0.24 | Satisfied | Satisfied | 18 | 3 | 7.1 | 1 |
| Example 8 | FIG. 8B | 0.24 | Satisfied | Satisfied | 18 | 3 | 7.1 | 1 |
| Example 9 | FIG. 6A | 0.24 | Satisfied | Satisfied | 18 | 3 | 7.1 | 1 |
| Example 10 | FIG. 6A | 0.24 | Satisfied | Satisfied | 18 | 3 | 7.1 | 1 |
| Example 11 | FIG. 6A | 0.24 | Satisfied | Satisfied | 18 | 3 | 7.1 | 1 |
| Example 12 | FIG. 6A | 0.24 | Satisfied | Satisfied | 18 | 3 | 7.1 | 1 |
| Example 13 | FIG. 6A | 0.24 | Satisfied | Satisfied | 18 | 3 | 7.1 | 1 |
| Example 14 | FIG. 6A | 0.24 | Satisfied | Satisfied | 18 | 3 | 7.1 | 1 |
| Example 15 | FIG. 6A | 0.26 | Satisfied | Satisfied | 18 | 3 | 7.6 | 0 |
| Example 16 | FIG. 6B | 0.26 | Satisfied | Satisfied | 18 | 2 | 11.3 | 0 |
| Example 17 | FIG. 7B | 0.24 | Satisfied | Satisfied | 18 | 3 | 7.1 | 1 |
| Example 18 | FIG. 7C | 0.24 | Satisfied | Satisfied | 18 | 2 | 10.6 | 1 |
| Comp. Ex. 5 | FIG. 10A | 0.24 | Satisfied | Satisfied | 25 | 3 | 3.9 | 1 |
| Comp. Ex. 6 | FIG. 10B | 0.24 | Satisfied | Satisfied | 10 | 3 | 9.8 | 1 |
| Comp. Ex. 7 | FIG. 10C | 0.24 | Satisfied | Satisfied | 18 | 3 | 7.1 | 3 |
| Example 19 | FIG. 10D | 0.24 | Satisfied | Satisfied | 18 | 3 | 7.1 | 1 |
| Example 20 | FIG. 10E | 024 | Satisfied | Satisfied | 18 | 3 | 7.1 | 1 |
| Example 21 | FIG. 7A | 0.24 | Satisfied | Satisfied | 18 | 3 | 7.1 | 1 |

|  | Total length (mm/mm$^2$) | Ground contact surface width of tread (min) | Width of land portion 3a (mm) | Width of land portion 3b (mm) | Internal pressure (kPa) | W1/W2 | ΣW1/W2 |
|---|---|---|---|---|---|---|---|
| Example 1 | 0 | 118 | 24.8 | 23.6 | 220 | 0 | 0 |
| Example 2 | 0 | 118 | 24.8 | 47.1 | 220 | 0 | 0 |
| Comp. Ex. 1 | 0 | 160 | 33.6 | 32.0 | 220 | 0 | 0 |
| Comp. Ex. 2 | 0 | 118 | 24.8 | 28.3 | 220 | 0 | 0 |
| Comp. Ex. 3 | 0 | 118 | 24.8 | 19.5 | 220 | 0 | 0 |
| Comp. Ex. 4 | 0.02 | 118 | 24.8 | 23.6 | 220 | 1 | 1 |
| Example 3 | 0.027 | 118 | 24.8 | 23.6 | 220 | 1 | 1 |
| Example 4 | 0.031 | 118 | 24.8 | 23.6 | 220 | 1 | 1 |
| Example 5 | 0.035 | 118 | 24.8 | 23.6 | 220 | 1 | 1 |
| Example 6 | 0.016 | 118 | 24.8 | 23.6 | 220 | 1 | 1 |
| Example 7 | 0.05 | 118 | 24.8 | 23.6 | 220 | 1 | 1 |
| Example 8 | 0.06 | 118 | 24.8 | 23.6 | 220 | 1 | 1 |
| Example 9 | 0 | 118 | 23.6 | 24.8 | 220 | 0 | 0 |
| Example 10 | 0 | 118 | 22.4 | 26.0 | 220 | 0 | 0 |
| Example 11 | 0 | 118 | 26.4 | 22 | 220 | 0 | 0 |
| Example 12 | 0 | 118 | 25.4 | 23 | 220 | 0 | 0 |
| Example 13 | 0 | 118 | 24.8 | 23.6 | 240 | 0 | 0 |
| Example 14 | 0 | 118 | 24.8 | 23.6 | 250 | 0 | 0 |
| Example 15 | 0 | 126 | 26.4 | 25.1 | 220 | 0 | 0 |
| Example 16 | 0 | 126 | 26.4 | 50.1 | 220 | 0 | 0 |
| Example 17 | 0.031 | 118 | 24.8 | 23.6 | 220 | 0.6, 0.6 | 1.2 |
| Example 18 | 0.031 | 118 | 24.8 | 47.1 | 220 | 0.6, 0.6 | 1.2 |
| Comp. Ex. 5 | 0.031 | 118 | 24.8 | 28.3 | 220 | 0.6, 0.6 | 1.2 |
| Comp. Ex. 6 | 0.031 | 118 | 24.8 | 19.5 | 220 | 0.6, 0.6 | 1.2 |
| Comp. Ex. 7 | 0.031 | 118 | 24.8 | 23.6 | 220 | 0.6, 0.6 | 1.2 |
| Example 19 | 0.031 | 118 | 24.8 | 23.6 | 220 | 0.2, 0.2 | 0.4 |
| Example 20 | 0.031 | 118 | 24.8 | 23.6 | 220 | 0.1, 0.8 | 0.9 |
| Example 21 | 0.031 | 118 | 24.8 | 23.6 | 220 | 0.5, 0.5 | 1 |

TABLE 5

|  | Wet braking performance | Driving stability | Dry braking performance | Wear resistance | In-use fuel economy |
|---|---|---|---|---|---|
| Example 1 | 103 | 110 | 110 | 110 | 107 |
| Example 2 | 101 | 112 | 111 | 112 | 107 |
| Comp. Ex. 1 | 95 | 98 | 98 | 96 | 93 |
| Comp. Ex. 2 | 88 | 103 | 101 | 100 | 101 |
| Comp. Ex. 3 | 96 | 97 | 95 | 95 | 98 |
| Comp. Ex. 4 | 100 | 100 | 100 | 100 | 100 |
| Example 3 | 105 | 105 | 105 | 105 | 105 |
| Example 4 | 107 | 105 | 105 | 105 | 105 |
| Example 5 | 107 | 106 | 107 | 106 | 106 |
| Example 6 | 106 | 107 | 108 | 108 | 107 |
| Example 7 | 107 | 106 | 107 | 106 | 106 |
| Example 8 | 104 | 104 | 104 | 103 | 104 |
| Example 9 | 103 | 109 | 109 | 110 | 107 |
| Example 10 | 102 | 108 | 107 | 108 | 105 |
| Example 11 | 102 | 109 | 109 | 108 | 105 |
| Example 12 | 103 | 110 | 110 | 110 | 107 |
| Example 13 | 105 | 115 | 114 | 110 | 115 |
| Example 14 | 110 | 113 | 115 | 112 | 120 |
| Example 15 | 102 | 112 | 112 | 112 | 105 |
| Example 16 | 101 | 112 | 113 | 114 | 105 |
| Example 17 | 106 | 107 | 109 | 107 | 106 |
| Example 18 | 105 | 109 | 110 | 108 | 106 |
| Comp. Ex. 5 | 92 | 101 | 99 | 98 | 100 |
| Comp. Ex. 6 | 98 | 95 | 94 | 93 | 98 |
| Comp. Ex. 7 | 96 | 93 | 92 | 92 | 90 |
| Example 19 | 104 | 107 | 109 | 109 | 107 |

TABLE 5-continued

|  | Wet braking performance | Driving stability | Dry braking performance | Wear resistance | In-use fuel economy |
|---|---|---|---|---|---|
| Example 20 | 104 | 106 | 107 | 107 | 105 |
| Example 21 | 106 | 107 | 108 | 108 | 106 |

It is understood from Table 5 that the tires of Examples 1 to 21 unanimously exhibited high fuel efficiency and were able to achieve good running performance on a wet road surface and good running performance on a dry road surface in a compatible manner.

Further, it is understood from comparison of Example 7 with Example 8 shown in Table 5 that Example 7 where "the total length o the auxiliary grooves per unit area of the ground contact surface of the tread" had been optimized exhibited better results (including better running performance on a dry road surface) than Example 8. Yet further, it is understood from comparison of Example 9 with Example 10 shown in Table 5 that Example 9 where the width in the tread width direction of the land portion 3a had been optimized exhibited better results (including better driving stability) than Example 10.

Yet further, it is understood from comparison of Example 11 with Example 12 shown in Table 5 that Example 12 where the width in the tread width direction of the land portion 3b had been optimized exhibited better results (including better driving stability) than Example 11.

Yet further, it is understood from comparison of Example 13 with Example 14 shown in Table 5 that Example 14 where the tire was used at high internal pressure exhibited better fuel efficiency and wet performance than Example 13.

Yet further, it is understood from comparison of Example 17 with Examples 4, 19 shown in Table 5 that Example 17 where W1/W2 and ΣW1/W2 had been optimized generally exhibited better wet braking performance, driving stability, dry braking performance and wear resistance than Examples 4, 19.

REFERENCE SIGNS LIST

1 Ground contact surface of tread
2a Main groove
2b Auxiliary groove
3a Outermost land portion in tread width direction
3b Tread-width-direction inner land portion
CL Tire equatorial plane
TE Tread end

The invention claimed is:

1. A pneumatic radial tire for a passenger vehicle, having a carcass constituted of plies as radially-disposed cords and provided in a toroidal shape across a pair of bead portions, and a tread, characterized in that:
   a ground contact surface of the tread of the tire is provided with either, as a groove, only at least one main groove extending in the tread circumferential direction or, as grooves, only the at least one main groove and at least one auxiliary groove other than the main groove, the auxiliary groove having a groove width 2 mm in a tread widthwise region having the center aligned with the tire equatorial plane and a width corresponding to 80% of the tread width of the ground contact surface;
   a negative ratio of the main groove is in the range of 12% to 20% (inclusive of 12% and 20%);
   a groove width of the main groove is in the range of 6 mm to 30 mm;
   provided that SW and OD represent cross sectional width and outer diameter of the tire, respectively, SW/OD≤0.26 when SW<165 (mm); and
   SW and OD satisfy a formula shown below when SW≥165 (mm):

$$OD \geq 2.135 \times SW + 282.3,$$

wherein provided that a land portion Z is demarcated by the main groove closest to each tread end and the borderline between the main groove and the tread end, of the tread widthwise region having the center aligned with the tire equatorial plane and a width corresponding to 80% of the tread width of the ground contact surface, following relationship formulae are satisfied in at least one of the tread-width-direction inner land portion and the land portion Z:

$$1/4 \leq W1/W2 \leq 3/4; \text{ and}$$

$$\Sigma W1 \geq W2, \text{ and}$$

wherein:
   W1 (mm) represents a projected length in the tread width direction of each auxiliary groove;
   W2 (mm) represents a width in the tread width direction of the land portion having said auxiliary groove, of at least one of said land portions; and
   ΣW1 represents the sum of projected lengths in the tread width direction of all auxiliary grooves disposed within one pitch in the tread circumferential direction of the auxiliary grooves.

2. The pneumatic radial tire for a passenger vehicle of claim 1, wherein SW/OD≤0.24.

3. The pneumatic radial tire for a passenger vehicle of claim 1, wherein the total length of the auxiliary grooves per unit area of the ground contact surface of the tread is >0 and ≤0.05 (mm/mm2).

4. The pneumatic radial tire for a passenger vehicle of claim 1, wherein the ground contact surface of the tread has: at least two main grooves extending in the tread circumferential direction; respective outermost land portions in the tread width direction each defined by the corresponding tread end and the corresponding main groove closest to the tread end; and at least one tread-width-direction inner land portion defined on the inner side in the tread width direction of the outermost land portions between the main grooves, such that the width in the tread width direction of each outermost land portion is at least ⅕ of the width of the ground contact surface of the tread.

5. The pneumatic radial tire for a passenger vehicle of claim 4, wherein a width in the tire width direction of each tread-width-direction inner land portion is at least 23 mm.

6. The pneumatic radial tire for a passenger vehicle of claim 1, wherein the number of the main grooves is three or less.

7. The pneumatic radial tire for a passenger vehicle of claim 4, wherein the at least one tread-width-direction inner land portion is provided with auxiliary grooves which are hole-like recesses having a diameter 2 mm.

8. The pneumatic radial tire for a passenger vehicle of claim 1, wherein SW≥165 (mm) and SW and OD satisfy the following formulae:

$$2.135 \times SW + 282.3 \leq OD < (1/0.25) \times SW.$$

9. A pneumatic radial tire for a passenger vehicle, having a carcass constituted of plies as radially-disposed cords and provided in a toroidal shape across a pair of bead portions, and a tread, characterized in that:
  a ground contact surface of the tread of the tire is provided with either, as a groove, only at least one main groove extending in the tread circumferential direction or, as grooves, only the at least one main groove and at least one auxiliary groove other than the main groove, the auxiliary groove having a groove width≤2 mm in a tread widthwise region having the center aligned with the tire equatorial plane and a width corresponding to 80% of the tread width of the ground contact surface;
  a negative ratio of the main groove is in the range of 12% to 20% (inclusive of 12% and 20%);
  a groove width of the main groove is in the range of 6 mm to 30 mm;
  provided that SW and OD represent cross sectional width and outer diameter of the tire, respectively, SW/OD≤0.26 when SW<165 (mm); and
  SW and OD satisfy a formula shown below when SW≥165 (mm):

$$OD \geq 2.135 \times SW + 282.3,$$

wherein a pitch or interval between the auxiliary grooves in the tread circumferential direction is in the range of 20 mm to 60 mm.

10. The pneumatic radial tire for a passenger vehicle of claim 9, wherein SW/OD≤0.24.

11. The pneumatic radial tire for a passenger vehicle of claim 9, wherein the total length of the auxiliary grooves per unit area of the ground contact surface of the tread is >0 and 0.05 (mm/mm2).

12. The pneumatic radial tire for a passenger vehicle of claim 9, wherein the ground contact surface of the tread has: at least two main grooves extending in the tread circumferential direction; respective outermost land portions in the tread width direction each defined by the corresponding tread end and the corresponding main groove closest to the tread end; and at least one tread-width-direction inner land portion defined on the inner side in the tread width direction of the outermost land portions between the main grooves, such that the width in the tread width direction of each outermost land portion is at least ⅕ of the width of the ground contact surface of the tread.

13. The pneumatic radial tire for a passenger vehicle of claim 9, wherein a width in the tire width direction of each tread-width-direction inner land portion is at least 23 mm.

14. The pneumatic radial tire for a passenger vehicle of claim 9, wherein the number of the main grooves is three or less.

15. The pneumatic radial tire for a passenger vehicle of claim 12, wherein the at least one tread-width-direction inner land portion is provided with auxiliary grooves which are hole-like recesses having a diameter≤2 mm.

16. The pneumatic radial tire for a passenger vehicle of claim 9, wherein SW≥165 (mm) and SW and OD satisfy the following formulae:

$$2.135 \times SW + 282.3 \leq OD < (1/0.25) \times SW.$$

* * * * *